US010635969B2

United States Patent
Amir et al.

(10) Patent No.: US 10,635,969 B2
(45) Date of Patent: Apr. 28, 2020

(54) CORE UTILIZATION OPTIMIZATION BY DIVIDING COMPUTATIONAL BLOCKS ACROSS CORES

(71) Applicant: INTERNATIONAL BUSINESS MACHINES CORPORATION, Armonk, NY (US)

(72) Inventors: Arnon Amir, San Jose, CA (US); Pallab Datta, San Jose, CA (US); Nimrod Megiddo, Palo Alto, CA (US); Dharmendra Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 867 days.

(21) Appl. No.: 15/294,303

(22) Filed: Oct. 14, 2016

(65) Prior Publication Data

US 2018/0107918 A1    Apr. 19, 2018

(51) Int. Cl.
*G06N 3/063* (2006.01)
*G06N 3/04* (2006.01)

(52) U.S. Cl.
CPC ............ *G06N 3/063* (2013.01); *G06N 3/049* (2013.01)

(58) Field of Classification Search
CPC ............ G06N 3/04; G06N 3/049; G06N 3/06; G06N 3/063
See application file for complete search history.

(56) References Cited

U.S. PATENT DOCUMENTS

| | | | |
|---|---|---|---|
| 8,996,430 B2 | 3/2015 | Modha | |
| 9,117,176 B2 | 8/2015 | Szatmary et al. | |
| 2018/0121796 A1* | 5/2018 | Deisher | G06N 3/063 |
| 2018/0300616 A1* | 10/2018 | Ambardekar | G06F 12/0862 |
| 2018/0307987 A1* | 10/2018 | Bleiweiss | G06N 3/082 |
| 2018/0322390 A1* | 11/2018 | Das | G06N 3/084 |
| 2019/0205736 A1* | 7/2019 | Bleiweiss | G06N 20/00 |
| 2019/0279072 A1* | 9/2019 | Gao | G06N 3/04 |
| 2019/0286973 A1* | 9/2019 | Kovvuri | G06N 3/04 |

OTHER PUBLICATIONS

Scheffler, Lee, "NeurOS and NeuroBlocks a Neural/Cognitive Operating System and Building Blocks," Biologically Inspired Cognitive Architectures 11, 2015, pp. 75-105.
Amir, Arnon, et al., "Cognitive Computing Programming Paradigm: a Corelet Language for Composing Networks of Neurosynaptic Cores," The 2013 International Joint Conference on Neural Networks (IJCNN), pp. 1-10, IEEE, 2013.

* cited by examiner

*Primary Examiner* — Stanley K. Hill
(74) *Attorney, Agent, or Firm* — Erik Huestis; Stephen Kenny; Foley Hoag LLP

(57) ABSTRACT

Core utilization optimization by dividing computational blocks across neurosynaptic cores is provided. In some embodiments, a neural network description describing a neural network is read. The neural network comprises a plurality of functional units on a plurality of cores. A functional unit is selected from the plurality of functional units. The functional unit is divided into a plurality of subunits. The plurality of subunits are connected to the neural network in place of the functional unit. The plurality of functional units and the plurality of subunits are reallocated between the plurality of cores. One or more unused cores are removed from the plurality of cores. An optimized neural network description is written based on the reallocation.

16 Claims, 12 Drawing Sheets

CORE UTILIZATION OPTIMIZATION BY DIVIDING COMPUTATIONAL BLOCKS ACROSS CORES

BACKGROUND

Embodiments of the present invention relate to optimizing a neurosynaptic network, and more specifically, to core utilization optimization by dividing computational blocks across neurosynaptic cores.

BRIEF SUMMARY

According to embodiment of the present disclosure, a method of and computer program product for optimizing a neurosynaptic network are provided. A neural network description describing a neural network is read. The neural network comprises a plurality of functional units on a plurality of cores. A functional unit is selected from the plurality of functional units. The functional unit is divided into a plurality of subunits. The plurality of subunits are connected to the neural network in place of the functional unit. The plurality of functional units and the plurality of subunits are reallocated between the plurality of cores. One or more unused cores are removed from the plurality of cores. An optimized neural network description is written based on the reallocation.

DETAILED DESCRIPTION

Figure 1:
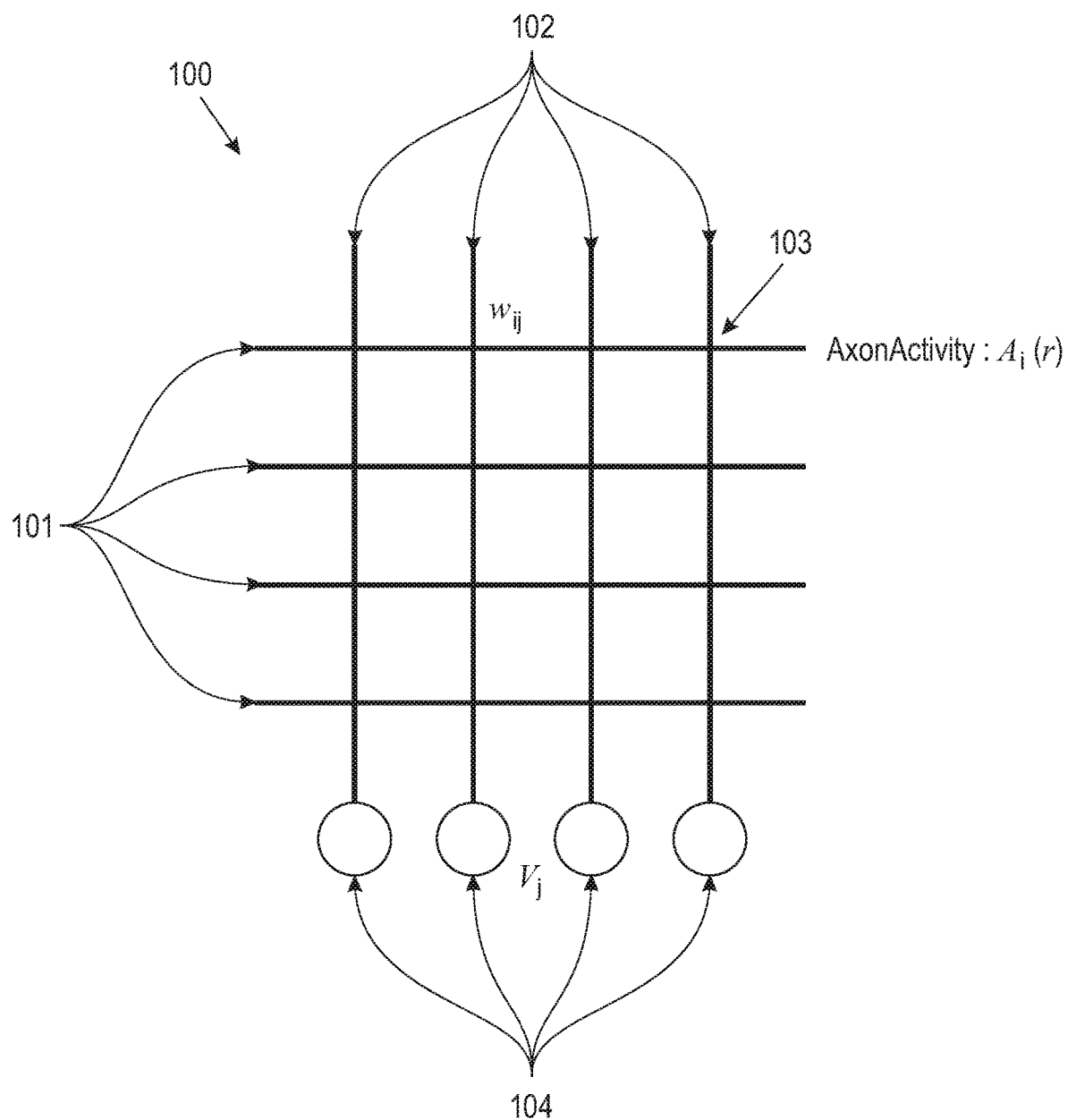
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

The number of cores required to implement a network is a significant cost factor. A single neurosynaptic chip may contain a number of cores. To implement a system, one or more chips are utilized. In general, the more cores that are packed on a single chip, the higher the size and the cost of the chip. Reducing the number of cores without affecting the functionality saves cost. In addition, when a network is deployed in large quantities, the optimization may be done once while the cost saving is multiplied by the number of deployed systems.

In a fixed-size chip or system with a given number of cores, one may apply optimization techniques and then use the cores freed as the result of optimization to provide additional functionality or to improve computation accuracy, and hence improve the product without additional hardware costs. In energy-sensitive systems, such as mobile systems, airborne systems, satellites, remote sensors and others, reducing the number of cores may in general reduce the system's energy consumption, although energy consumption depends also on other factors, such as inter-core communication. In a simulated network, reducing the number of cores saves memory, processing cycles and the number of processors, thus increasing speed, reducing power and reducing overall processing time. Accordingly, there is a significant need to reduce the number of cores needed to implement a given neurosynaptic system.

According to various embodiments of the present disclosure, new systems and methods are provided for further reducing the number of cores by modifying network topology. Unlike various alternative methods, certain embodiments of the present disclosure increase the number of neurons for the purpose of reducing the number of cores. By breaking large computational blocks into several smaller ones, these computation blocks may be packed more efficiently on a smaller number of cores. The increase in neuron utilization rate compensates for the increase in the number of neurons and reduces the total number of cores, which is a significant compactness criteria. The approach of adding neurons to thereby reduce the number of cores is advantageous because many of the costs in core-based architectures are associated with the number of cores, rather than the number of utilized neurons and axons. Therefore, by adding neurons and reducing the number of cores these system costs are reduced. The resulting modified network produces the same output as computed by the original network.

Embodiments of the present disclosure include methods for adding neurons to a network for the purpose of reducing the total number of cores. The subject matter of the present disclosure may be combined with various block-based optimizations, after which large blocks may be broken into smaller blocks. The optimization rules described herein, find an optimal way to break large blocks into smaller ones. Several embodiments preserve functionality (guaranteeing one-to-one correspondence of output spikes). Other embodiments may cause slight modifications in spike activity, such as changing spikes timing. The latter may be applied when the network, or the affected part of it, is known to be agnostic to such changes. For example, a continuous-rate code is invariant to a constant delay.

Various exemplary embodiments described herein are illustrated by optimizing splitter neurons and, while increasing the number of splitter neurons in a network, being able to better compact the smaller splitters onto cores thereby reducing the number of cores. Splitter neurons are neurons that are used to increase the fan-out of other neurons. While splitter neurons are used to illustrate various embodiments of the present disclosure, the present disclosure is not limited to splitters and is applicable to other types of neurons and axons.

In some embodiments, a splitter is divided into two or more splitters. Breaking a splitter into two (or more) is achieved in various embodiments by combinations of the following techniques. In some embodiments, the splitter is broken into two subgroups. In such embodiments, one output is added to the first subgroup and connected to the input of the second subgroup. In some embodiments, the splitter is broken into K subgroups. In some such embodiments, another K-way splitter is created. The new splitter is connected to the K subgroups, thereby creating a two-layer hierarchical splitter. In some such embodiments, the splitter is broken into K subgroups. In some such embodiments, the source neuron is replicated K times and each of these source neurons is connected to one of the K subgroups. In some embodiments, the resulting splitters are then relocated to cores using block-optimization techniques. The resulting layout saves cores on the chip, and thus reduces cost and power consumption.

As set forth herein, the approach outlined above with regard to splitters is applicable to other types of blocks in a more general way. Splitters are widely used in neurosynaptic networks, and so the application of this the present disclosure to even just splitter blocks has a significant impact on the number of cores used by many networks.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
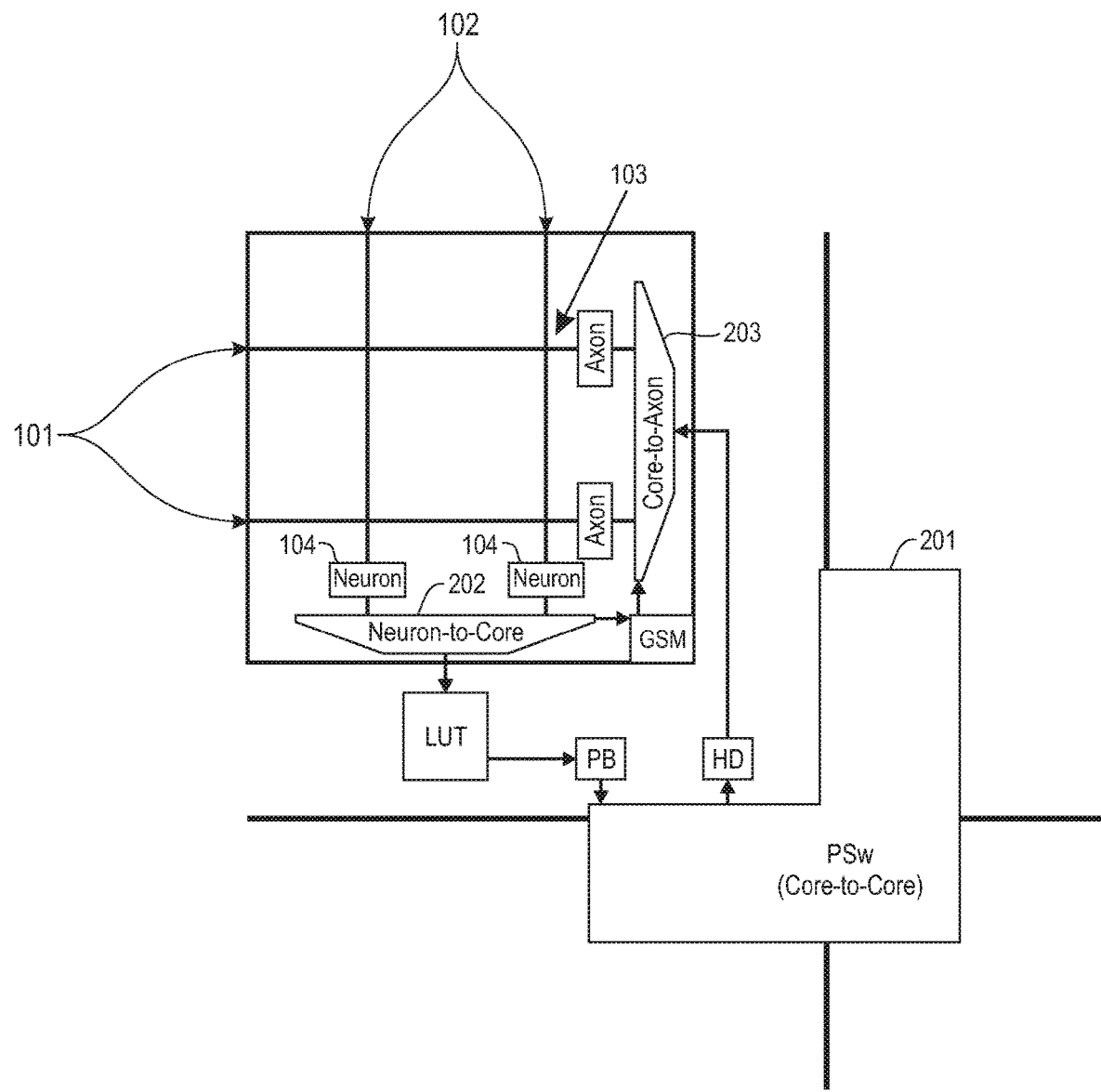
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core. Long-distance connectivity is logical. An exemplary embodiment is depicted in FIG. 2. Mesh router 201 provides communication between cores. Also on a given core, neuron to core 202 and core to axon 203 communication links are provided.

Figure 3:
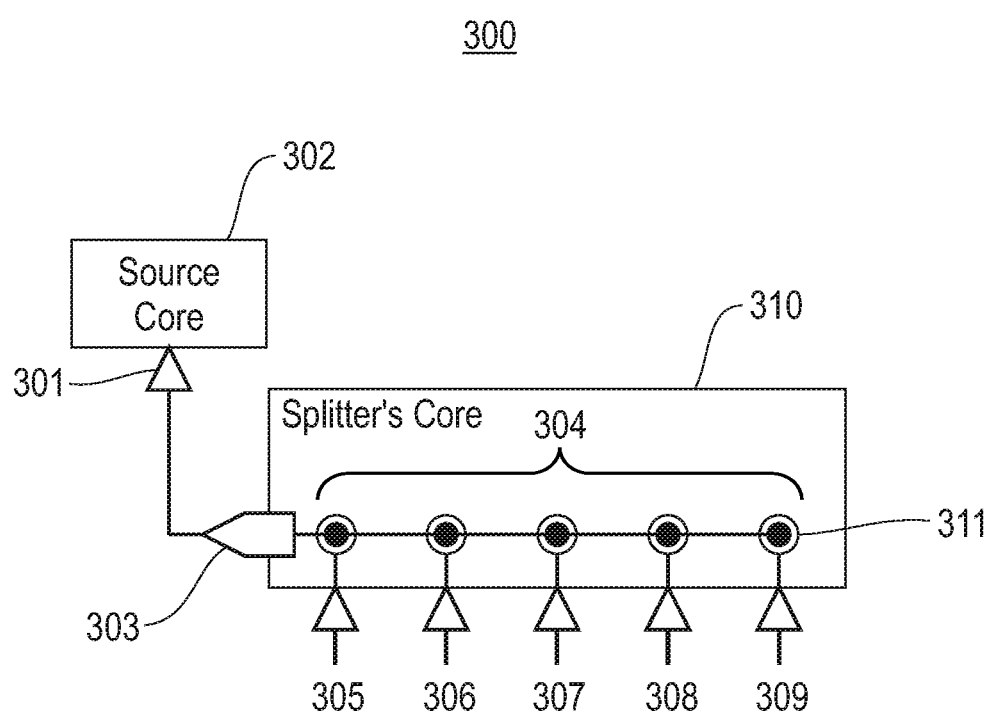
FIG. 3 depicts an exemplary core arrangement prior to optimization according to embodiments of the present disclosure.

With reference now to FIG. 3, an exemplary core arrangement prior to optimization is illustrated. Neurosynaptic network 300 includes a source neuron 301 in a source core 302, connected to an input axon 303 of a splitter 304 with five output neurons 305 . . . 309 (the splitter output). The splitter is part of core 310. Each of the five neurons is connected to the input axon via a synapse 311 on the core's crossbar. Each output of the splitter is connected to some destination (not shown). The core may also contain other parts of the network, also not shown here.

The splitter block is the part of the core taken by the splitter, containing all its neurons, axons and crossbar parts. In this case, the block contains one axon 403, five synapses 311 and five neurons 305 . . . 309. Splitter blocks always have a single input axon and one row of synapses and neurons. However, the present disclosure is also applicable to blocks of other dimensions, as explained later.

Figure 4:
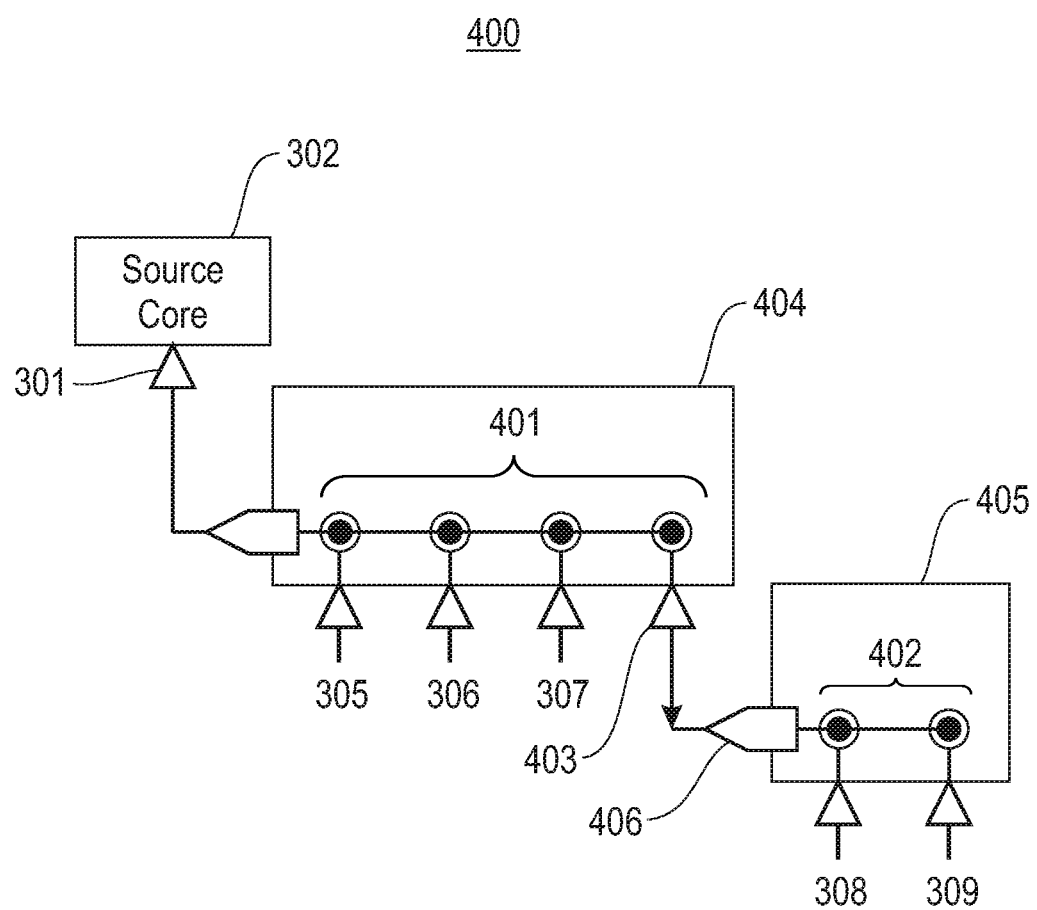
FIG. 4 depicts an exemplary core arrangement after optimization according to embodiments of the present disclosure.

With reference now to FIG. 4, an exemplary core arrangement after optimization according to a first method is illustrated. In some embodiments, the splitter 304 is broken into two subgroups 401, 402. An output 403 is added to the first subgroup 401 on core 404. Output 403 is connected to the input axon 406 of the second subgroup 402 on core 405. Accordingly, a splitter block of size N is replaced by two blocks of size $N_1+1+N_2=N+1$. In this example, $N=5$, $N_1=3$, and $N_2=2$. The source core is not impacted by this modification to the network. This modification introduces an additional delay in the outputs of core 405. If desired, the splitter outputs 305 . . . 307 of core 401 can be set with additional delay to be kept in sync with outputs 308 . . . 309 in core 405.

Figure 5:
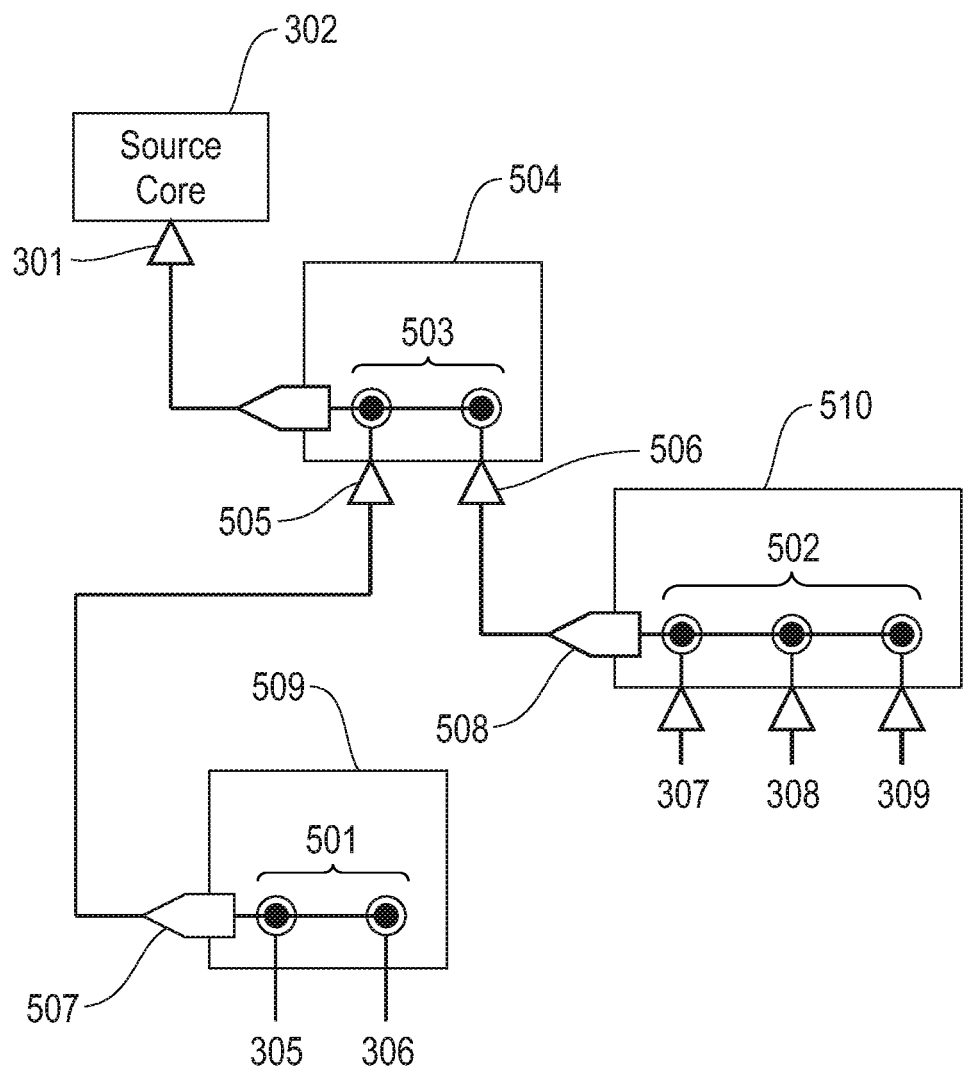
FIG. 5 depicts another exemplary core arrangement after optimization according to embodiments of the present disclosure.

With reference now to FIG. 5, an exemplary core arrangement after optimization according to a second method is illustrated. In some embodiments, splitter 304 is broken into K subgroups, 501 . . . 502. A new splitter 503 with K outputs is created on core 504 and its K outputs 505 . . . 506 are connected to the input axons 507 . . . 508 of the K subgroups, on cores 509 . . . 510. In the illustrated example, $K=2$. According to embodiments of this method, a splitter block of size N is replaced by K blocks of size $N_1+ \ldots +N_K=N$ and an additional block of size K. The source core is not impacted by this modification to the network. This modification introduces an additional delay of one tick to all splitter outputs 305 . . . 309.

Figure 6:
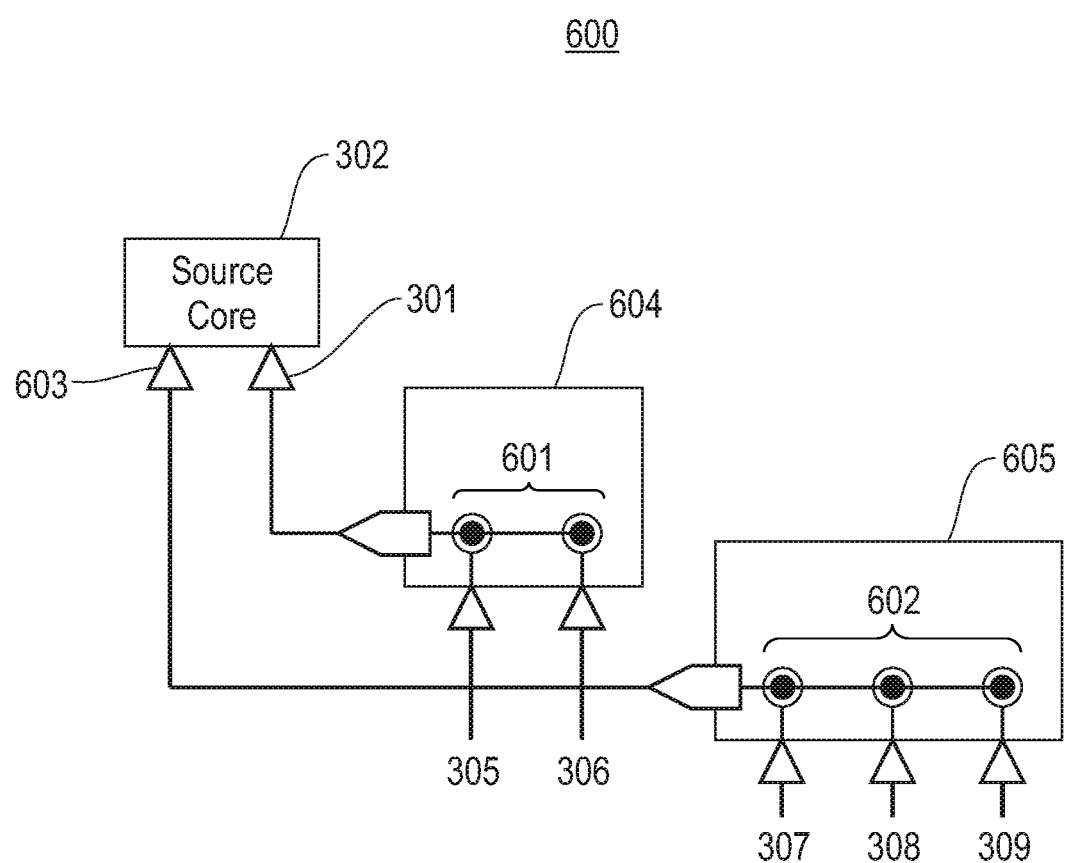
FIG. 6 depicts another exemplary core arrangement after optimization according to embodiments of the present disclosure.

With reference now to FIG. 6, an exemplary core arrangement after optimization according to a third method is illustrated. In some embodiments, splitter 304 is broken into K subgroups 601 . . . 602. An additional K−1 neurons 603 are added on source core 302, configured the same as the original source neuron 301. Each of the K source neurons are connected to a splitter subgroup 601 . . . 602, residing on core 604 . . . 605. In the illustrated example, $K=2$. According to embodiments of this method, a splitter block of size N is replaced by K blocks of size $N_1+ \ldots +N_K=N$ and an additional K−1 neurons are added on source core 302 to the block to which the original source neuron belongs. The source core is impacted by this modification to the network by the addition of extra neurons. If the original source neuron cannot be replicated (for example, when it is a stochastic neuron), then this method may be inapplicable. This modification introduces no additional delays to the splitter outputs 305 . . . 309.

It will be appreciated that alternative divisions of splitters may be practiced according to the present disclosure. The present disclosure is applicable irrespective of the particular method used for splitter division. In the case where an original splitter is a hierarchical splitter, it may be reorganize it into a different hierarchical splitter. For example, in some embodiments, the splitters are first merged and then divided according to methods described herein to arrive at a new arrangement.

Figure 7:
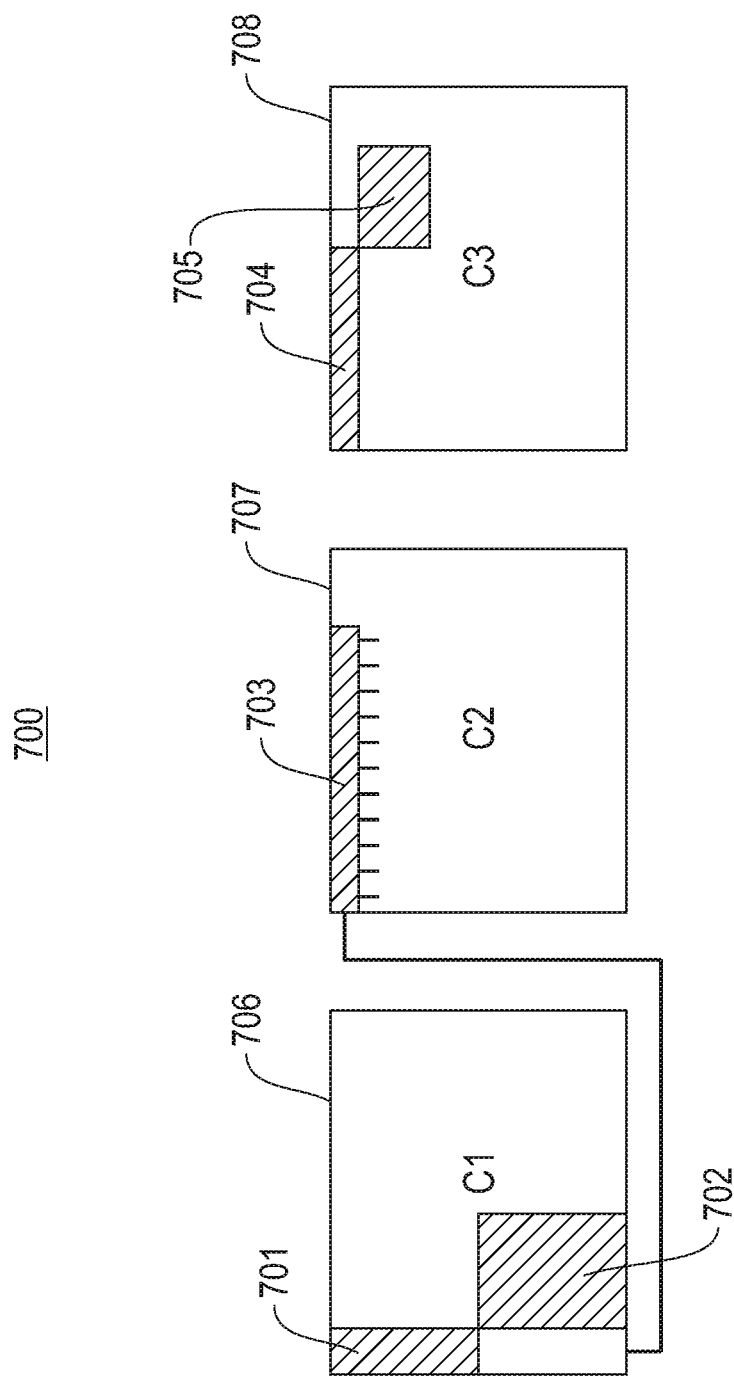
FIG. 7 depicts an exemplary block arrangement prior to optimization according to embodiments of the present disclosure.
Figure 8:
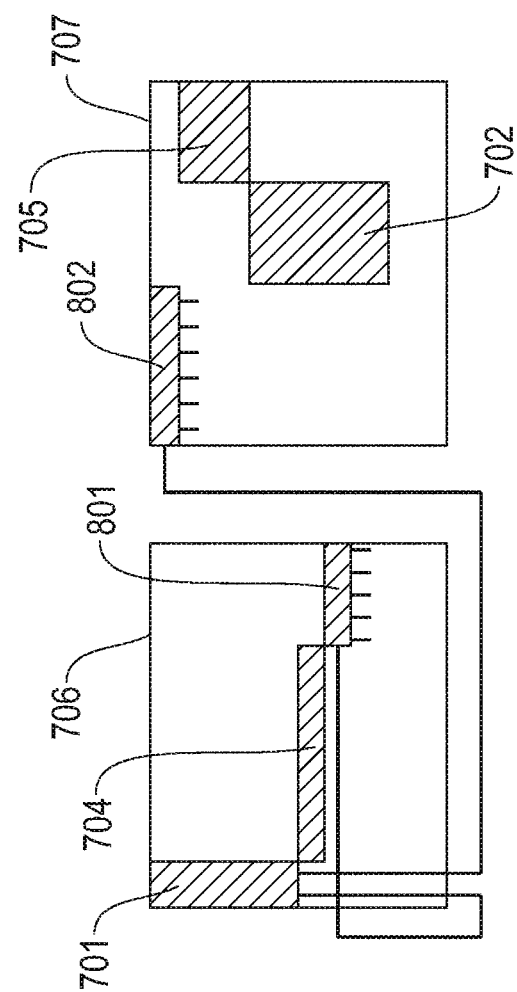
FIG. 8 depicts an exemplary block arrangement after optimization according to embodiments of the present disclosure.

With reference now to FIGS. 7-8, block reorganization according to embodiments of the present disclosure is illustrated. Breaking splitters into blocks alone does necessarily not save cores. To save cores, the blocks need to be reorganized on cores. However, without breaking splitters, the reorganization process may not be feasible given core layout constraints, or may not be able to produce as favorable result. Accordingly, the present disclosure provides for optimizing the number of cores beyond what is achievable through block-based optimization alone.

Referring to FIG. 7, an exemplary network 700 is illustrated. Network 700 includes blocks 701 . . . 705 on cores 706 . . . 708. Referring to FIG. 8 splitter block 703 is broken into two subgroups, splitters 801 . . . 802. An extra source neuron is added to block 701 (for example, applying the methods described above). In this way, the blocks may now be reorganized to reduce the total number of cores from 3 to 2. In this example, reduction to two cores is not possible without breaking block 703.

In this example, the method described with regard to FIG. 6 is applicable to break splitter block 703 into 801 and 802. One neuron is added to block 701. Blocks are then rearranged using block optimization. As a result, the network takes just 2 cores instead of 3. In this example, there is no way to rearrange the blocks of the original network on two cores because 701 and 702 are required to be on two separate cores. Block 702 cannot fit with 703, not it can fit with 704 in combination with 705 (all blocks must have disjoint rows and columns).

To find which splitters to break and how, an optimization process is applied in some embodiments. As set forth below, in some embodiments, an optimization model solves simultaneously for optimal splitters division and blocks reorganization for any given network with any number of splitters. This formulation automatically finds the best two-ways breakdown of all splitters in the system to minimize the total number of cores.

Given are k types of tiles of height greater than 1. There are $k_i$ tiles of type i ($i=1, \ldots, k$), each of height $a_i$ and width $b_i$ ($1 \leq a_i, b_i \leq 256$). In addition, there are given s more tiles, $R_1, \ldots, R_s$, each of height 1, called splitters. A splitter is one of 254 types, corresponding to the possible widths 2, 3, . . . , 255 (splitters of length 256 are handled during preprocessing, and length 1 does not exist). Denote by $r_i$ the width of $R_i$, $i=1, \ldots, s$.

A splitter can be replaced by a set of smaller splitters. If a splitter of width w is replaced by $K>1$ smaller splitters, then the total width of the smaller splitters in a feasible replacement is $w+K-1$. The precise description of feasible replacement is given below.

The optimization problem follows. First, the splits may be replaced by a larger number of smaller splits, and then each tile, including the replacement splits, should be assigned to one of the n sites $S_1, \ldots, S_n$, so as to minimize the number of utilized sites, subject to the constraints described below.

Denote by $y_j$, $j=1, \ldots, n$, boolean variables such that $y_j=1$ if and only if site $S_j$ is active.

Denote by $x_{ij}$ an integer variable so that $x_{ij}$ is the number of tiles of type i (of height greater than 1) that are assigned to site $S_j$.

The variables below describe how a splitter is broken into shorter splitters if at all. Denote by $z_{il}$ a nonnegative integer decision variable representing the number of replacement splitters of width l in a replacement of input splitter $R_i$. Thus, the total width of replacement splitters of $R_i$ is given by Equation 1.

$$\sum_{l=2}^{r_i} l \cdot z_{il} \quad \text{Equation 1}$$

The replacement is said to be feasible if this number satisfies Equation 2, or simply, Equation 3.

$$\sum_{l=2}^{r_i} l \cdot z_{il} = r_i + \sum_{l=2}^{r_i} z_{il} - 1 \quad \text{Equation 2}$$

$$\sum_{l=2}^{r_i} (l-1) \cdot z_{il} = r_i - 1 \quad \text{Equation 3}$$

For l=2, ..., 255, the total number of all of the replacement splitters of width l is given by Equation 4.

$$\sum_{i=1}^{S} z_{il} \quad \text{Equation 4}$$

Denote by $w_{lj}$ a nonnegative integer decision variable representing the number of replacement splitters of width l that are assigned to site $S_j$.

Thus, we wish to minimize Equation 5 subject to the constraints of Equation 6, wherein $x_{ij}$, $z_{il}$, $w_{lj}$ are nonnegative integers and $y_j \in \{0,1\}$. Given a network to optimize, this optimization problem may be solved using optimization packages such as CPLEX.

$$\sum_{j=1}^{n} y_j \quad \text{Equation 5}$$

$$\sum_{j=1}^{n} x_{ij} \quad (i=1, \ldots, k) \quad \text{Equation 6}$$

$$\sum_{l=2}^{r_i} (l-1) \cdot z_{il} = r_i - 1 \quad (i=1, \ldots, s)$$

$$\sum_{j=1}^{n} w_{lj} = \sum_{i=1}^{s} z_{il} \quad (l=2, \ldots, 255)$$

$$\sum_{i=1}^{k} b_i x_{ij} + \sum_{l=2}^{255} l \cdot w_{lj} \leq 256 y_j \quad (j=1, \ldots, n)$$

$$\sum_{i=1}^{k} a_i x_{ij} + \sum_{l=2}^{255} w_{lj} \leq 256 y_j \quad (j=1, \ldots, n)$$

In general, breaking other types of compute blocks into smaller blocks may be considered with regard to two cases—dividing horizontal blocks by vertical divisors into several columnar sub-blocks, and dividing vertical blocks by horizontal divisors into several row blocks. These two cases may be applied iteratively to further break large blocks both ways into smaller and smaller blocks. Since the number of neurons and axons increase each time a block is broken, there is an optimal point where further subdivision of blocks is not going to reduce the number of cores, and might in fact increase it. This optimal point is the most optimal reorganization of the network into cores.

Figure 9:
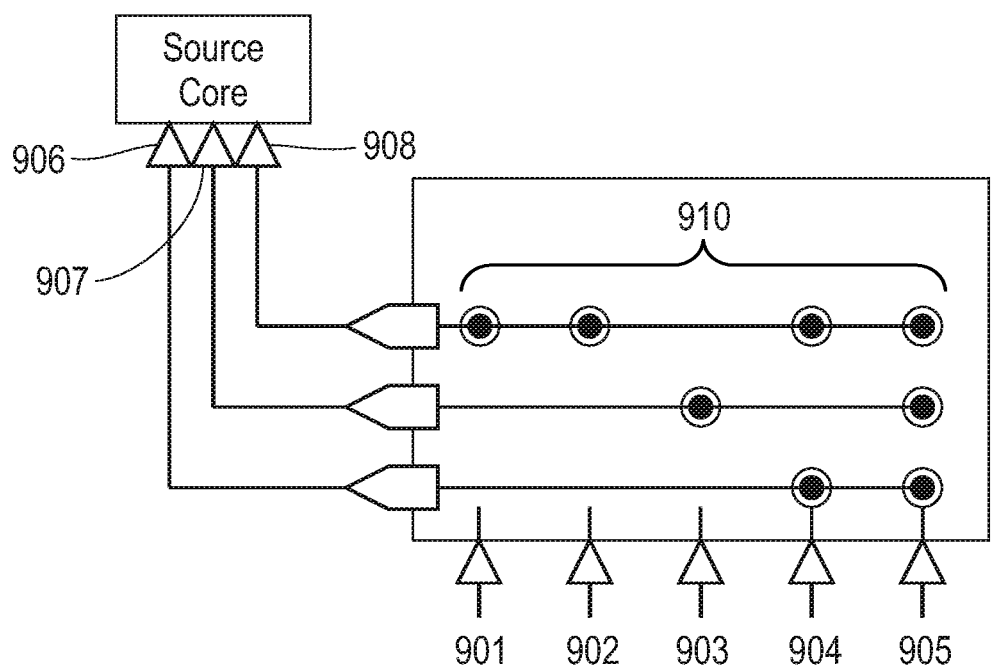
FIG. 9 depicts an exemplary core arrangement prior to optimization according to embodiments of the present disclosure.
Figure 10:
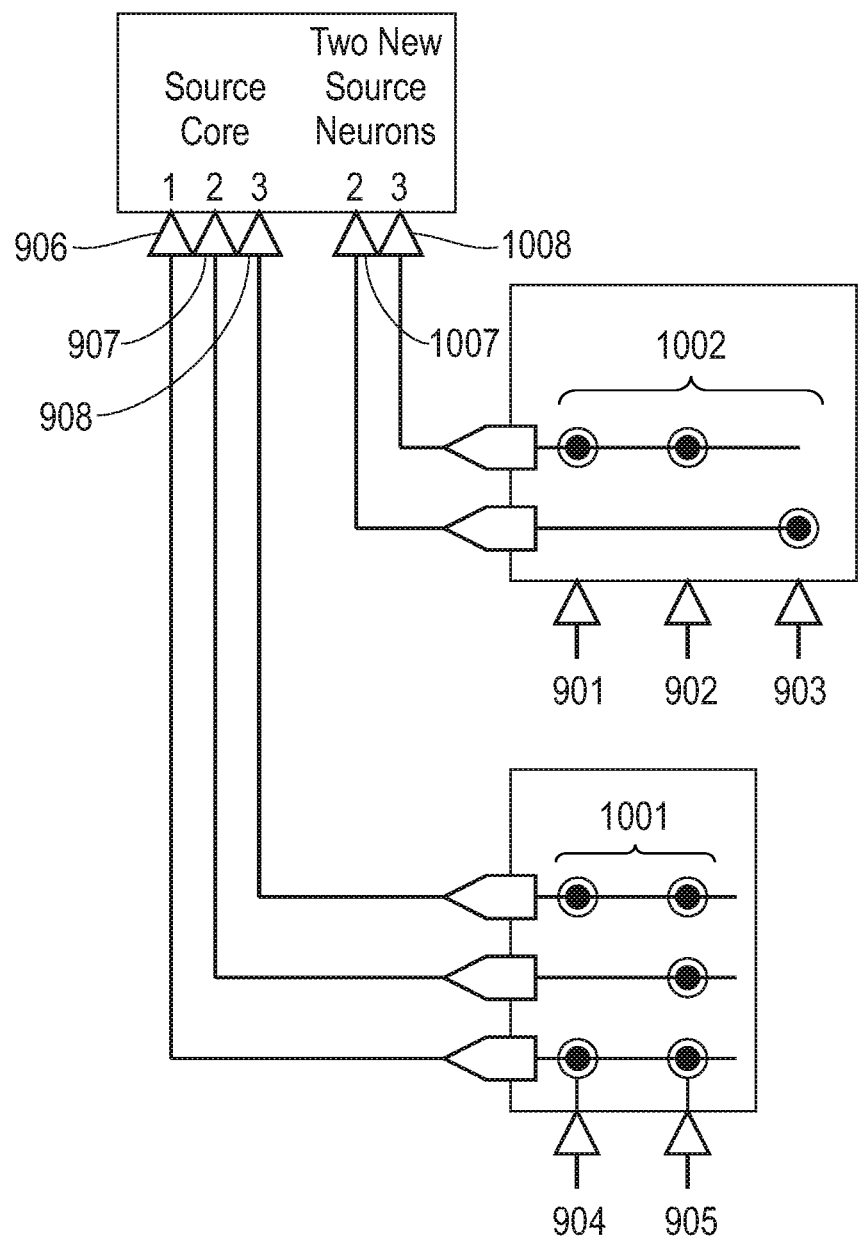
FIG. 10 depicts an exemplary core arrangement after optimization according to embodiments of the present disclosure.

With reference now to FIG. 9-10, breaking a horizontal block into several smaller blocks by splitting it into several columnar blocks according to embodiments of the present disclosure is illustrated. A horizontal block may be any general computational primitive, typically having more columns than rows. Breaking it into several columnar sub-blocks may aid block optimization and reduce the number of cores.

To break such a block 910 according to embodiments of the present disclosure, the columns of block 910 are split into K≥2 sub-block groups 1001 . . . 1002. For each sub-block group, enumerate the participating axon lines 906 . . . 908. In general, not all sub-blocks must use all axon lines. A variable length splitter is created, splitting each source of the input axon into the required number of copies 1007 . . . 1008, using any of the above described splitter techniques. The outputs of the splitter 907 . . . 908, 1007 . . . 1008 are connected to each of the K sub-blocks 1001 . . . 1002, as described above. The sub-blocks 1001 . . . 1002 may now be relocated to other cores. Specifically, the original block is removed from the blocks list, the splitter block/s are added to the list and the K sub-blocks are added to the block list. Block optimization may then be applied.

Similarly, a vertical block may be broken into several smaller blocks by splitting it into several rows. A vertical block may be any general computational primitive, typically having more rows than columns. Breaking it into several row sub-blocks may aid block optimization and reduce the number of cores. To break such a block, the rows are split into K≥2 sub-block groups. For each sub-block group, enumerate the participating axon lines. Each block has a disjoint group of axons (no shared axons). For each sub-block a new replica is created of the original neurons. The synaptic synaptic weights which correspond to the group of axons are kept. In some embodiments, properties such as thresholds and leaks may be modified so that it will output the partial weighted sum for this block. The axons of this group are connected to the source neurons which were connected to them in the original block. A new adder block is created. It receives all K outputs for each column from all K sub-blocks and sums them up. The original threshold and leak are applied on the total of the partial sums, per column.

The sub-blocks may now be relocated to other cores. Specifically, the original block is removed from the blocks list, the adder block is added to the list and the K sub-blocks are added to the block list. Block optimization is then applied.

Some core-based architectures may be unsuitable for block divisions. For example, the case of vertical blocks may not be applicable to certain embodiments of TrueNorth because they lack a general way to compute a partial sum by a neuron and send it to the adder block.

Embodiments of the present disclosure have various advantages. The present disclosure is applicable to any TrueNorth network, independent of the way it was generated. This avoids the need to modify existing code of network generation. Optimizations described herein take place after the network creation has been completed. Moreover, in general, it is hard to write code that creates networks with complex functionality while at the same time ensuring efficient core utilization. Being able to first focus on the functionality and then run the resulted network through optimization is an important benefit of this approach. Optimizations described herein consider all the network components at once, and are able to take advantage by mixing blocks from one part of the system with blocks from another part of the system to create a more efficient core utilization. This advantage cannot be achieved by improving the code used to generate individual parts. The optimization problems described herein may be solved by different algorithms without requiring rebuild of the neurosynaptic systems. They may also be applied on the output of previously optimized components and networks, as for examples is the case when using a linker to link together several networks, separately generated, into one combined network.

Figure 11:
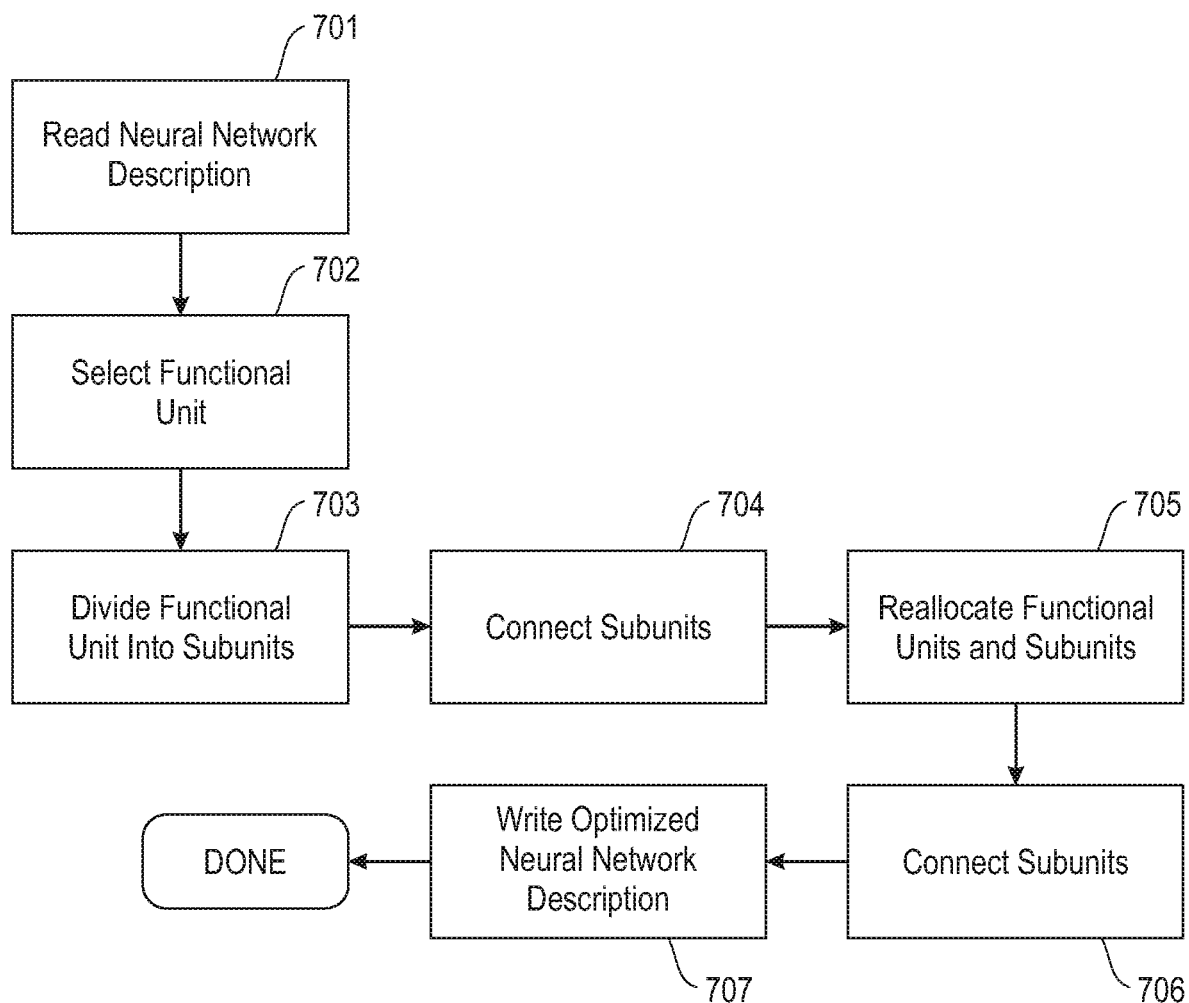
FIG. 11 illustrates an optimization method according to embodiments of the present disclosure.

Referring now to FIG. 11, an exemplary process for optimizing a neurosynaptic network is illustrated. A neural network description is read 701. In some embodiments, the neural network description comprises a model file describing a network and a placement file describing the relative placement of cores. For example, in a TrueNorth implementation, the model file may be an un-optimized model file describing a TrueNorth network and the placement file may define where each core from the model will be placed in the TrueNorth hardware. At 702, a functional unit is selected from the plurality of functional units. As noted above, a functional unit may be a splitter or another discrete functionality comprising one or more neuron and axon connected by one or more synapse. In some embodiments, a functional unit may be defined by a corelet. At 703, the functional unit is divided into a plurality of subunits using a method such as those described above. At 704, the plurality of subunits are connected to the neural network in place of the functional unit using methods such as those described above. At 705, the plurality of functional units and the plurality of subunits are reallocated between the plurality of cores using methods such as those described above. At 706, one or more unused cores are removed from the plurality of cores. After optimization, an optimized description of the network is written 706. In some embodiments, the optimized description is written to an optimized model file. In some embodiments, the optimized model file is then used to perform layout of neurons in one or more physical core.

Figure 12:
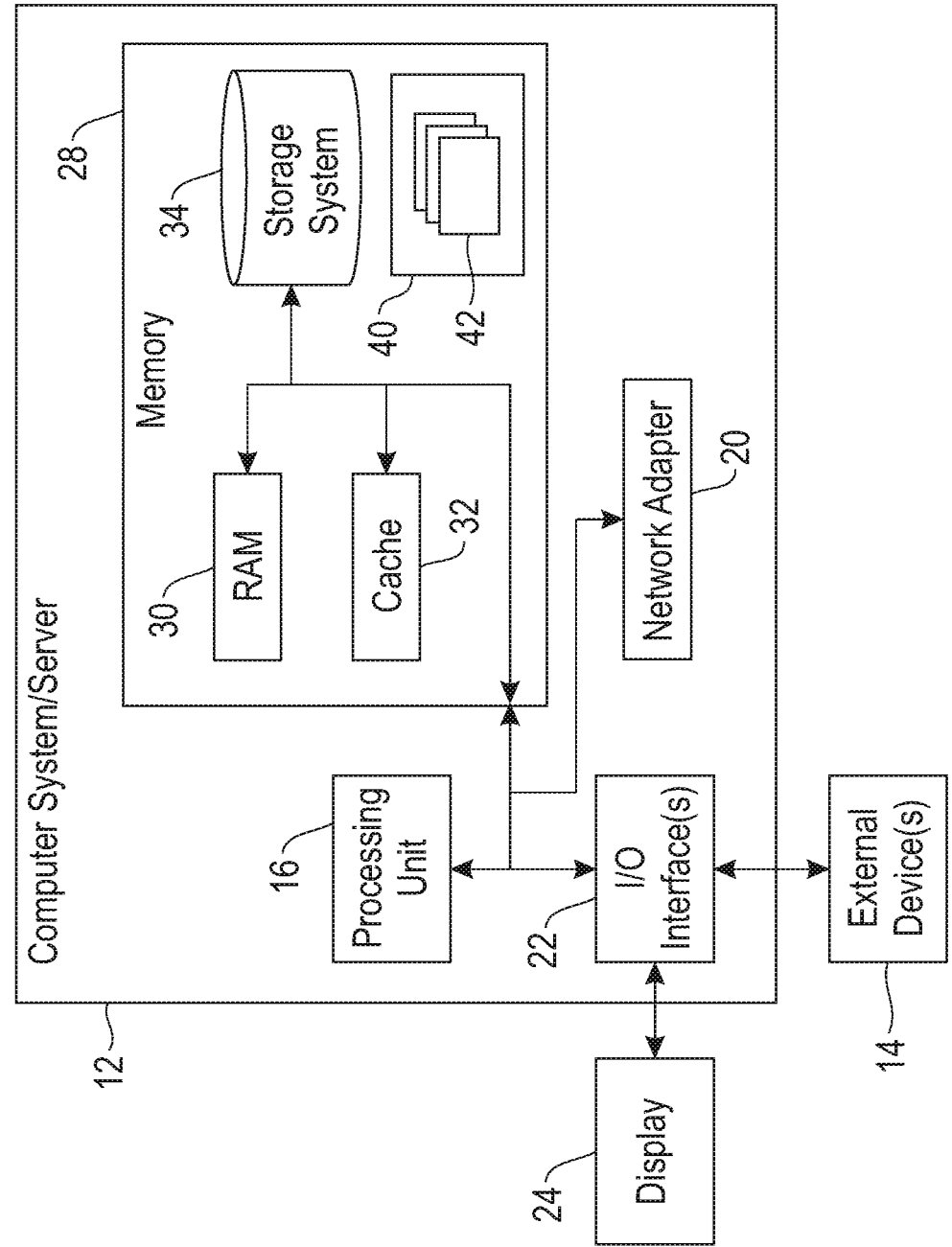
FIG. 12 depicts a computing node according to an embodiment of the present invention.

Referring now to FIG. 12, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   reading a neural network description describing a neural network comprising a plurality of functional units on a plurality of cores;
   selecting a functional unit of the plurality of functional units;
   dividing the functional unit into a plurality of subunits;
   connecting the plurality of subunits to the neural network in place of the functional unit;
   reallocating the plurality of functional units and the plurality of subunits between the plurality of cores;
   removing one or more unused core of the plurality of cores;
   writing an optimized neural network description based on the reallocation.

2. The method of claim 1, wherein the neural network description and the optimized neural network description have substantially the same functionality.

3. The method of claim 1, wherein the functional unit comprises a splitter.

4. The method of claim 1, wherein dividing the functional unit comprises:
   identifying at least one axon providing input to the functional unit;
   replicating the at least one axon; and
   connecting the replicated axon to one of the plurality of subunits.

5. The method of claim 1, wherein connecting the plurality of subunits to the neural network comprises:
   adding a splitter to the neural network; and
   connecting the splitter to each of the plurality of subunits.

6. The method of claim 1, wherein connecting the plurality of subunits to the neural network comprises:
   connecting an axon of one of the plurality of subunits to a neuron of another of the plurality of subunits.

7. The method of claim 1, wherein the plurality of subunits and the reallocation are determined by application of an optimization model.

8. The method of claim 7, wherein the optimization model solves simultaneously for optimal division and reallocation.

9. A computer program product for optimizing a neurosynaptic network, the computer program product comprising a computer readable storage medium having program instructions embodied therewith, the program instructions executable by a processor to cause the processor to perform a method comprising:
   reading a neural network description describing a neural network comprising a plurality of functional units on a plurality of cores;
   selecting a functional unit of the plurality of functional units;
   dividing the functional unit into a plurality of subunits;
   connecting the plurality of subunits to the neural network in place of the functional unit;
   reallocating the plurality of functional units and the plurality of subunits between the plurality of cores;
   removing one or more unused core of the plurality of cores;
   writing an optimized neural network description based on the reallocation.

10. The computer program product of claim 9, wherein the neural network description and the optimized neural network description have substantially the same functionality.

11. The computer program product of claim 9, wherein the functional unit comprises a splitter.

12. The computer program product of claim 9, wherein dividing the functional unit comprises:
   identifying at least one axon providing input to the functional unit;
   replicating the at least one axon; and
   connecting the replicated axon to one of the plurality of subunits.

13. The computer program product of claim 9, wherein connecting the plurality of subunits to the neural network comprises:
   adding a splitter to the neural network; and
   connecting the splitter to each of the plurality of subunits.

14. The computer program product of claim 9, wherein connecting the plurality of subunits to the neural network comprises:
   connecting an axon of one of the plurality of subunits to a neuron of another of the plurality of subunits.

15. The computer program product of claim 9, wherein the plurality of subunits and the reallocation are determined by application of an optimization model.

16. The computer program product of claim 15, wherein the optimization model solves simultaneously for optimal division and reallocation.

* * * * *